US006248676B1

(12) United States Patent
Dischler

(10) Patent No.: US 6,248,676 B1
(45) Date of Patent: Jun. 19, 2001

(54) BULLET RESISTANT FABRIC AND METHOD OF MANUFACTURE

(75) Inventor: Louis Dischler, Spartanburg, SC (US)

(73) Assignee: Milliken & Company, Spartanburg, SC (US)

( * ) Notice: Subject to any disclaimer, the term of this patent is extended or adjusted under 35 U.S.C. 154(b) by 1527 days.

(21) Appl. No.: 08/573,884

(22) Filed: Dec. 18, 1995

Related U.S. Application Data

(63) Continuation-in-part of application No. 08/212,694, filed on Mar. 14, 1994, now abandoned, which is a continuation of application No. 07/948,069, filed on Sep. 21, 1992, now abandoned, which is a continuation of application No. 07/779,806, filed on Oct. 21, 1991, now abandoned.

(51) Int. Cl.[7] ............................... B32B 5/02; B32B 27/04
(52) U.S. Cl. ........................ 442/101; 428/378; 428/902; 428/911; 442/135; 442/394
(58) Field of Search .................................. 428/378, 902, 428/911, 224–290; 442/101, 135, 394

(56) References Cited

U.S. PATENT DOCUMENTS

| | | | |
|---|---|---|---|
| 4,623,574 | * 11/1986 | Harpell et al. | 428/113 |
| 4,650,710 | * 3/1987 | Harpell et al. | 428/911 |
| 4,688,604 | * 8/1987 | Griffiths | 138/129 |
| 4,816,336 | * 3/1989 | Allou, Jr. et al. | 428/361 |
| 4,847,115 | * 7/1989 | Warren et al. | 528/423 |
| 4,878,920 | * 11/1989 | Russell et al. | 8/476 |
| 5,035,111 | * 7/1991 | Hogenboom et al. | 428/377 |
| 5,316,830 | * 5/1994 | Adams, Jr. et al. | 428/195 |

OTHER PUBLICATIONS

Encyclopedia of Textiles, Fibers, and Nonwoven Fabrics; Editor—Martin Grayson; Publisher John Wiley & Sons; 1984; pp. 32–34, 42–43, 348–349.*

* cited by examiner

Primary Examiner—Blaine Copenheaver
(74) Attorney, Agent, or Firm—Terry T. Moyer; William S. Parks

(57) ABSTRACT

A ballistic resistant fabric formed by placing a polymer film on the fibers of a high tenacity fiber fabric which has a coefficient of friction higher than the coefficient of friction of the high tenacity fibers.

5 Claims, 1 Drawing Sheet

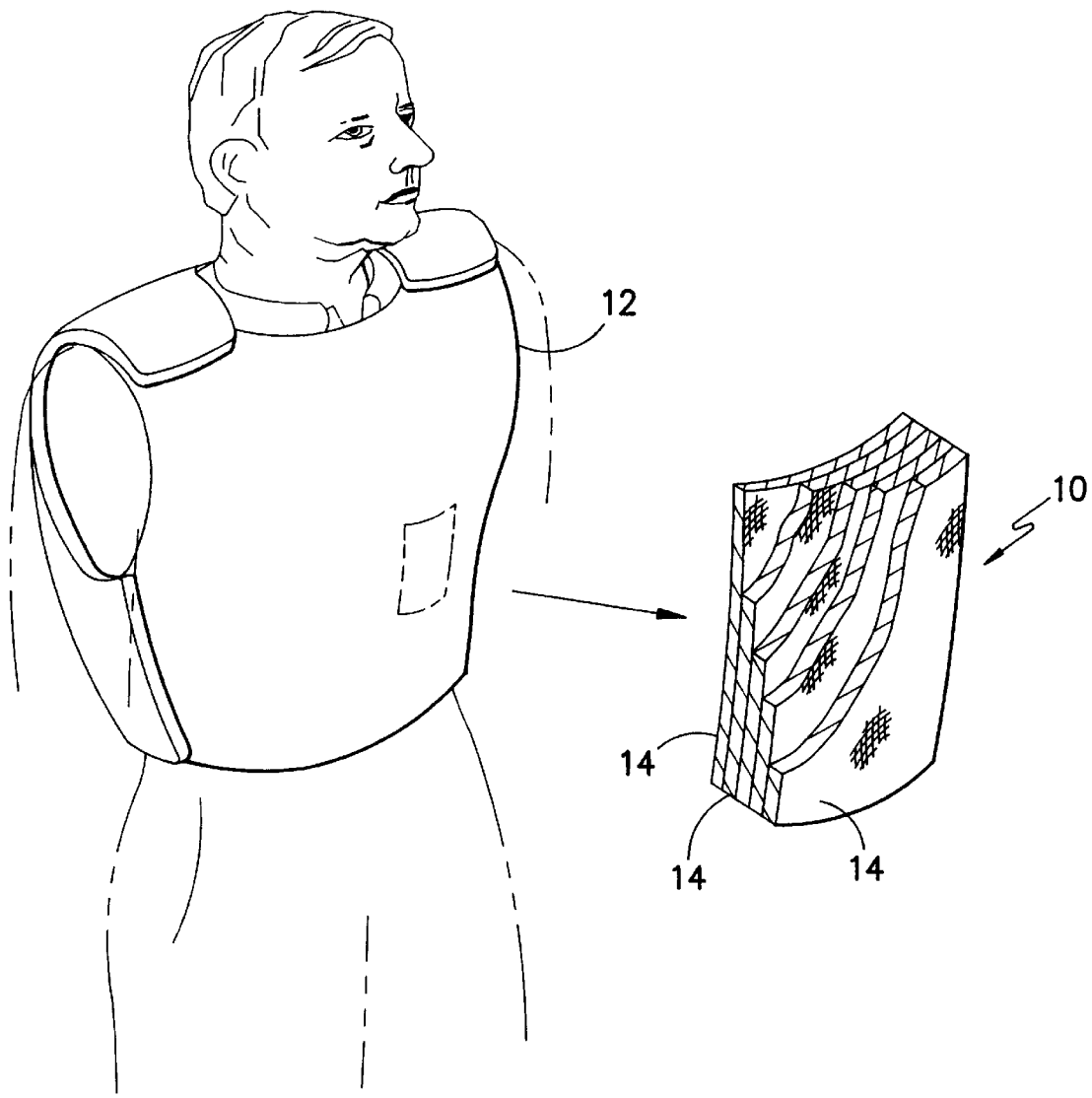

BULLET RESISTANT FABRIC AND METHOD OF MANUFACTURE

This application is a continuation-in-part of prior application Ser. No. 08/212,694,filed on Mar. 14, 1994, of Louis Dischler for BULLET RESISTANT FABRIC AND METHOD OF MANUFACTURE now abandoned, which in turn was a continuation of application of Ser. No. 07/948, 069, filed on Sep. 21, 1992 now abandoned, which in turn was a continuation application of Ser. No. 07/779,806, filed on Oct. 21, 1991, now abandoned.

The present invention relates to combinations of polymeric fibers having low coefficients of friction with polymeric coatings having high coefficients of friction to provide a fabric which is more resistant to penetration by metallic or other objects such as bullets, flechettes, shrapnel, etc.

Polymer fibers having high tensile strength and high modulus typically are highly oriented, resulting in very smooth fiber surfaces and a low coefficient of friction. Such fibers, when used in the construction of ballistic fabrics, exhibit poor energy transfer to neighboring fibers during ballistic impact, resulting in loss of stopping efficiency. Because of this loss of efficiency, more fabric layers are required to stop a projectile of a given velocity. Known methods of increasing the coefficient by roughing such as sanding or corona treatment have limited utility due to the degradation in tensile strength of the fiber.

Another method of increasing energy transfer between adjacent fibers or yarns in ballistic fabric is to coat the fabric with a polymer having a high coefficient of friction. One deficiency in this approach is fiber to fiber bonds that may form, resulting in stress reflections at yarn crossovers during ballistic impact and premature fiber breakage. Another deficiency is the large weight gain typical of coatings, which may be several percent. This added weight degrades the ballistic efficiency, which is taken as the energy adsorbed per unit areal density. Since the coating itself has negligible tensile strength when compared to the fiber, it reduces the average tensile strength of the fabric. Yet another deficiency of some coatings is a lack of adequate adherence of the coating to the smooth fiber surface. Material that is stripped off during a ballistic impact can serve to reduce the effective coefficient of friction by acting as a dry lubricant between fibers.

Hogenboom, et al., U.S. Pat. No. 5,035,111, disclose a method for improving the ballistic performance of fabric by core spinning high strength fibers in combination with weaker fibers having a higher coefficient of friction. These relatively high friction fibers, present at a 5 to 25% level by weight, degrade the ballistic efficiency in the same manner as high add-on coating. Although gains in ballistic performance may be made by increasing the energy transfer yarn to yarn, concomitant reductions in performance must necessarily result from the presence of large amounts of ballistically inferior fiber.

Kevlar® is the preferred fiber used in the fabrics but other fibers which could conventionally be used includes other high tenacity fibers such as aramid fibers such as poly(phenylenediamine terephthalamide), graphite fibers, nylon fibers and the like so long as the tensile strength is equal to 10 grams/denier or above to qualify as high tenacity fibers.

It is an object of the present invention to supply a ballistic fabric composed of high strength, high modulus polymeric fibers, coated with a thin, high friction polymeric material.

It is a further object of this invention to supply said fabric with a coating tenaciously adhering to the fibers of the substrate with few or substantially no fiber to fiber bonds.

Other objects and advantages of the invention will become readily apparent as the specification proceeds to describe the invention with resect to accompanying drawings, in which: a flexible impact resistant article of clothing is shown with a portion thereof in cross-section to show the construction thereof.

Looking now to the drawing, the fabric 10 is shown made into a bullet resistant vest 12 and basically comprises a multiplicity of Kevlar® fabrics 14 treated as hereindescribed and connected together by stitching or other means to form the vest 12. The outer face of the vest 12 can be treated with a water repellant finish, if desired.

According to the invention, it has been found that a polymer film deposited on the fiber by the method described in Kuhn, et al., U.S. Pat. Nos. 4,803,096; 4,877,646; 4,981,718; 4,975,317; and 5,030,508 improves the ballistic performance of fabrics measurably. A polypyrrole film, when deposited onto the fiber composing a Kevlar® fabric at a film thickness of less than about 2 microns and preferably about 0.15microns, was found to increase the flechette resistance by about 19%. A flechette is a military weapon that resembles a nail with small fins which when launched at ballistic velocities is unusually penetrating. When tested against a 0.22 caliber bullet fired from a rifle, an 18 layer stack of coated Kevlar® fabric was penetrated to a depth of only 3 or 4 layers, as compared to a depth of 6 or 7 layers for an 18 layer stack of uncoated fabric. Furthermore, the coating remained completely adhered to the fiber even in the area of direct impact. Other films, such as polyaniline can be formed so long as the coating has a coefficient of friction higher than the high tenacity fiber of the basic fabric.

In the case of ballistic fabric of exceptionally tight weave, it is found that some debris and crossover bonds do form during the coating, due to a certain amount of dendritic growth. In this case, it is necessary to remove the debris and break apart the bonding which can be accomplished most efficiently by vibrating the fabric by means of air stream directed between the fabric and a rigid plate by one or more air jets as described in U.S. Pat. No. 4,837,902.

EXAMPLE

Fifty grams of a Kevlar fabric woven in a balanced weave with 200 denier Kevlar® 29 warp and weft yarn is placed in a closed container with 29.0 grams of the oxidizing agent $FeCl_3$ with 750 ml of water and agitated at room temperature. Then 2.0grams of the monomer pyrrole mixed with 250 ml of water was added to $FeCl_3$ solution over a period of30 minutes while continuing to agitate the container. Then the closed container was agitated for an additional period of 3½ hours to polymerize the pyrrole and coat same onto the Kevlar® fabric. The coated fabric was then removed from the container, rinsed and air dried. It was found that the coefficient of friction (8) of the coated Kevlar® had increased from 0.19 for the untreated Kevlar® fabric to 0.27 for the treated fabric.

Then, since the treated fabric exhibited some cross-over bonding and debris the treated fabric agitated by passing a high speed air stream between the fabric and a flat plate as disclosed in U.S. Pat. No. 4,837,902 to cause saw-toothed waves to form in the treated fabric to break apart the bonds formed between fibers to eject the debris collected therein. Air was supplied at 30 p.s.i. as the treated fabric flowed therethrough at an average fabric speed of about 30 yards per minute. After this treatment the coefficient of friction (f) of the fabric was 0.24resulting in about a 19% improvement in stopping a flechette than an uncoated fabric.

Although the preferred embodiment of the invention has been described, it is contemplated that changes may be made without departing from the scope or spirit of the invention and it is desired that the invention be limited only by the scope of the claims.

I claim:

1. A fabric resistant to penetration by foreign objects such as bullets, flechettes, etc. comprising: a plurality of layers of woven fabric adjacent and in contact with each other, said woven fibers having warp amd weft yarns of high tenacity continuous filaments yarns, said coated filaments having a coefficient of friction higher than the coefficient of friction of the high tenacity filaments with substantially no filament-to-filament bonding of the coated filaments of the warp and weft yarns, said polymeric film having a thickness less than about 2 microns and including a polypyrrole.

2. A fabric resistant to penetration by foreign objects such as bullets, flechettes, etc. comprising: a plurality of layers of woven fabric adjacent and in contact with each other, said woven fabric having warp and weft yarns of high tenacity continuous filaments interwoven together and a polymeric film coated on the filaments of said warp and weft yarns, said coated filaments having a coefficient of friction higher than the coefficient of friction of the high tenacity filaments with substantially no filament-to-filament bonding of the coated filaments of the warp and weft yarns.

3. The fabric of claims 2 wherein said high tenacity fibers are aramid.

4. A fabric according to claim 2 wherein said high tenacity fiber is poly(para-phepylene terephthalamide).

5. A fabric according to claim 2 wherein said polymeric film coated on the fiaments has a thickness less than about 2 microns.

* * * * *